US009262385B2

(12) United States Patent
Ebner

(10) Patent No.: US 9,262,385 B2
(45) Date of Patent: Feb. 16, 2016

(54) AUTOMATIC RETRIEVAL OF THEMES AND OTHER DIGITAL ASSETS FROM AN ORGANIZATIONAL WEBSITE

(75) Inventor: Rachel Ebner, Raanana (IL)

(73) Assignee: SAP Portals Israel Ltd, Ra'anana (IL)

( * ) Notice: Subject to any disclaimer, the term of this patent is extended or adjusted under 35 U.S.C. 154(b) by 514 days.

(21) Appl. No.: 13/472,778

(22) Filed: May 16, 2012

(65) Prior Publication Data

US 2013/0311877 A1 Nov. 21, 2013

(51) Int. Cl.
G06F 17/22 (2006.01)

(52) U.S. Cl.
CPC .......... G06F 17/2247 (2013.01); G06F 17/227 (2013.01)

(58) Field of Classification Search
USPC ......................... 715/236, 234, 205
See application file for complete search history.

(56) References Cited

U.S. PATENT DOCUMENTS

| 6,088,711 | A  | * | 7/2000  | Fein et al. ..................... 715/269 |
| 6,463,440 | B1 | * | 10/2002 | Hind et al. .................... 715/235 |
| 7,783,967 | B1 | * | 8/2010  | Carnell et al. ................ 715/234 |
| 7,844,897 | B1 | * | 11/2010 | Cooley et al. ................. 715/243 |
| 7,873,972 | B2 |   | 1/2011  | Shaburov et al. |
| 8,121,970 | B1 | * | 2/2012  | Tung et al. ..................... 706/47 |
| 8,548,909 | B1 | * | 10/2013 | Snow et al. ..................... 705/42 |
| 2003/0167315 | A1 | * | 9/2003 | Chowdhry et al. ............ 709/218 |
| 2004/0139384 | A1 | * | 7/2004 | Lin .............................. 715/500 |
| 2004/0230901 | A1 | * | 11/2004 | Godwin et al. ................ 715/513 |
| 2006/0200751 | A1 | * | 9/2006 | Underwood et al. ......... 715/501.1 |
| 2007/0168936 | A1 |   | 7/2007 | Shaburov et al. |
| 2008/0163162 | A1 |   | 7/2008 | Shaburov et al. |
| 2008/0250310 | A1 | * | 10/2008 | Chen et al. .................... 715/234 |
| 2009/0019386 | A1 | * | 1/2009 | Sweetland et al. ............ 715/765 |
| 2009/0217352 | A1 | * | 8/2009 | Shen et al. ....................... 726/3 |
| 2009/0235159 | A1 | * | 9/2009 | Hosoda ......................... 715/235 |
| 2010/0145924 | A1 | * | 6/2010 | Zabramski et al. ........... 707/709 |
| 2010/0161385 | A1 | * | 6/2010 | Karypis et al. .................. 705/10 |
| 2010/0280962 | A1 | * | 11/2010 | Chan ............................. 705/301 |
| 2011/0010454 | A1 | * | 1/2011 | Anuff et al. .................... 709/225 |
| 2011/0162059 | A1 |   | 6/2011 | Helfman et al. |
| 2011/0162074 | A1 |   | 6/2011 | Helfman et al. |
| 2012/0102176 | A1 | * | 4/2012 | Lee et al. ....................... 709/223 |
| 2012/0254825 | A1 | * | 10/2012 | Sharma et al. ................ 717/101 |
| 2013/0268836 | A1 | * | 10/2013 | Barak .......................... 715/234 |
| 2014/0101528 | A1 | * | 4/2014 | Pelleg et al. ................... 715/234 |

OTHER PUBLICATIONS

Wikipedia [online] "Enterprise Portal" Last modified Apr. 13, 2012 [Retrieved from the Internet May 16, 2012] <URL: http://en.wikipedia.org/wiki/Enterprise_portal>.

* cited by examiner

Primary Examiner — Andrew Dyer
(74) Attorney, Agent, or Firm — Fish & Richardson P.C.

(57) ABSTRACT

The present disclosure involves systems, software, and computer implemented methods for determining one or more themes for a portal site. One example process includes operations for identifying a reference to an organizational site that is to be used as a thematic basis for a new portal site. The reference is used to identify a representation of the organizational site. The representation is analyzed based on an analysis rule set. At least one potential theme associated with the organizational site is determined, based on the analysis, and the at least one potential theme is presented to a user.

12 Claims, 10 Drawing Sheets

| Entry | Element | Style | Appearances | Weight |
|---|---|---|---|---|
| 1 | H1 | Arial font-face | 4 | 100% |
| 2 | H1 | red foreground, Arial font-face | 1 | 25% |
| 3 | H1 | red foreground | 1 | 25% |
| 4 | H1 | blue foreground, Arial font-face | 1 | 25% |
| 5 | H1 | blue foreground | 1 | 25% |
| 6 | H2 | black foreground, Arial font-face, itali | 2 | 100% |
| 7 | P | Arial font-face, 12 point | 2 | 100% |
| 8 | A | Arial font-face, blue foreground, 12 pt | 2 | 100% |
| 9 | Table Cell | Courier font-face | 1 | 100% |
| 10 | Input | centered, bold, Arial font-face | 1 | 33% |
| 11 | Input | left-Justified, Arial font-face | 2 | 67% |

Intermediate Style Information Structure

FIG. 6C

AUTOMATIC RETRIEVAL OF THEMES AND OTHER DIGITAL ASSETS FROM AN ORGANIZATIONAL WEBSITE

TECHNICAL FIELD

The present disclosure relates to computer-implemented methods, software, and systems for determining one or more themes for a portal site.

BACKGROUND

Enterprise portals are frameworks for integrating information, people, and processes across organizational boundaries. Portals can provide a secure unified access point, often in the form of a web-based user interface, and are designed to aggregate and personalize information through application-specific portlets and components. One hallmark of enterprise portals is the decentralized content contribution and content management, which keeps the information always updated. In many cases, specific portal pages may be defined by a highly experienced administrator using a portal content administration environment or a key user within a particular organization using specific tools to define aspects, relationships, and connections for and between content provided within specific portal pages.

SUMMARY

The present disclosure involves systems, software, and computer implemented methods for determining one or more themes for a portal site. One example process includes operations for identifying a reference to an organizational site that is to be used as a thematic basis for a new portal site. The reference is used to identify a representation of the organizational site. The representation is analyzed based on an analysis rule set. At least one potential theme associated with the organizational site is determined, based on the analysis, and the at least one potential theme is presented to a user.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 6C is a table illustrating an example intermediate style information structure.

DETAILED DESCRIPTION

Figure 1:
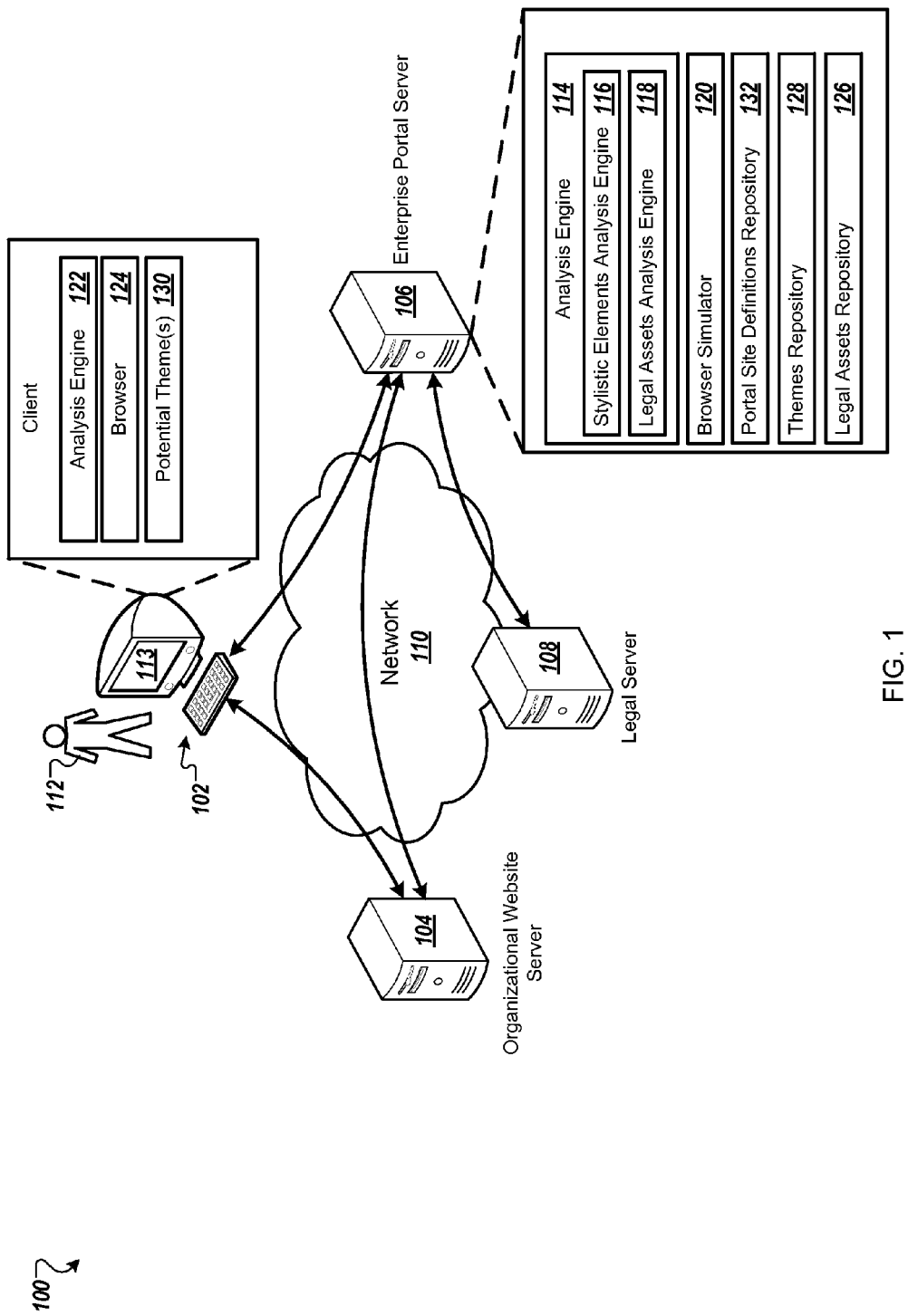
FIG. 1 is a block diagram illustrating an example system for determining one or more themes for a portal site.

FIG. 1 is a block diagram illustrating an example system 100 for determining one or more themes for a portal site. Specifically, the illustrated environment 100 includes or is communicably coupled with one or more clients 102, an organizational website server 104, an enterprise portal server 106, a legal server 108, and a network 110.

A user 112 (e.g., a user of the client 102) is an employee of an organization (e.g., an organization, such as a corporation, that is associated with the organizational website server 104). The user 112 may desire to create a portal site that is accessible to internal employees of the organization and/or to users that are external to the organization. The user 112 may, for example, desire to create a new portal site that includes one or more applications or that provides one or more documents, or other content.

The user 112 may desire that the new portal site has a similar style and branding as other organizational websites hosted by the organizational website server 104. However, the user 112 may not be familiar with website or portal site development and may not desire to invest much time in developing the style and branding of the new portal site. Further, the user 112 may desire to create the new portal site with little or no involvement from IT (Information Technology) personnel of the organization. The user 112 may or may not be aware that organizational guidelines state that a portal site associated with the organization is to include or to link to various legal assets, such a privacy policy, terms of use information, copyright information, contact information, or trademark information, to name a few examples.

The user 112 may identify an existing organizational site as a site to use as a thematic basis for the new portal site. The user 112 may, for example, identify a reference (e.g., a URL (Uniform Resource Locator)) of or to the existing organizational site. The user 112 may provide the reference to the existing organizational site to an analysis engine 114 included in the enterprise portal server 106. The illustrated analysis engine 114 includes a stylistic elements analysis engine 116 and a legal assets analysis engine 118.

The analysis engine 114 can use the reference to the organizational site to identify a representation of the organizational site. The representation can include, for example, HTML (HyperText Markup Language) and CSS (Cascading Style Sheets), among others. In some implementations, the analysis engine 114 can invoke a browser simulator 120 included in the enterprise portal server 106 to generate a DOM (Document Object Model) that corresponds to the organizational site. The DOM is a cross-platform and language-independent convention for representing and interacting with objects in HTML, XHTML, and XML documents.

In some implementations, the analysis engine 114 can run on the client 102, as illustrated by analysis engine 122. In such implementations, the client's analysis engine 122 can use the reference to the organizational site to request the representation of the organizational site. A browser 124 running on the client 102 can generate a DOM that corresponds to the representation. In some instances, the DOM can be generated inside the presented page within the browser 124, within an iFrame of the analysis engine, or in a separate page or iFrame, as is appropriate.

The analysis engine 114 or the analysis engine 122 can analyze the representation based on an analysis rule set. In some implementations, the analysis rule set is based on user input. For example, the user 112 can be presented the existing organizational site (e.g., on a graphical user interface (GUI) 113). In some implementations, a representation or certain elements of the existing organizational site can be presented. The user can select or identify particular elements of the organizational site to use as a thematic basis for the new portal site. For example, the user 112 can select elements of the existing organizational site that have a style that the user 112 desires for the new portal site. The analysis rule set can be defined, at least in part, on information associated with the selected elements. This can help to ensure the suggested, or proposed, theme meets the user's specific requirements.

The analysis rule set can be based on a legal asset analysis and/or on a stylistic analysis. For example, the stylistic elements analysis engine 116 can analyze the representation to identify a set of styles used for each of multiple element types (e.g., headers, paragraph text, images, user interface controls). The legal assets analysis engine 118 can identify one or more candidate styles for each element type, based, for example, on how frequently each style is used for a particular element type. The candidate styles can be incorporated into one or more potential themes for the new portal site that are to be presented to the user 112.

The legal assets analysis engine 118 can identify a set of legal asset-related phrases for which to search in the representation. Legal asset-related phrases can relate to privacy, terms of use, copyright, trademarks, contact information, or an organizational logo, to name a few examples. The legal asset phrases can be predefined or can be maintained by an administrator, such as in a legal assets repository 126. As another example, legal asset phrases can be received from the legal server 108. The legal server 108 can, for example, offer a service to provide current legal asset-related phrases and concepts which may be relevant to an organizational website. In some implementations, legal phrases are offered in multiple languages. The enterprise portal server 106 can request current legal asset-related phrases from the legal server 108 periodically (e.g., to periodically update the legal asset repository 126) or on demand (e.g., each time the legal assets analysis engine 118 performs an analysis). In still other instances, data from the legal server 108 can be cached at the portal server 106 to allow for quick, local searching.

The legal assets analysis engine 118 can search the representation of the organizational site to identify legal asset elements that are associated with at least one legal asset-related phrase. For example, the legal asset analysis engine 118 can search text, identifiers, file paths, and other metadata or information associated with an element. In some instances, items or elements within a particular distance from a previously-identified legal asset element may also be identified as potential legal assets. Each identified legal asset element can be incorporated into the potential themes that are to be presented to the user 112 for the new portal site. Although the above description describes both a legal asset analysis and a stylistic analysis being performed, in some implementations, the user 112 can request that either only a legal asset analysis or only a stylistic analysis be performed.

Potential themes determined by the analysis engine 114 or the analysis engine 122 can be stored in a themes repository 128 or in memory of the client 102 (e.g., as potential themes 130), respectively. As mentioned, one or more potential themes for the new portal site can be presented to the user 112 (e.g., in the browser 124). In some implementations, one potential theme is determined and is presented to the user 112. In other implementations, the analysis engine 114 or the analysis engine 122 determines multiple potential themes and the multiple potential themes are presented to the user 112. The user 112 can view each of the multiple potential themes and can select a particular potential theme for the new portal site. In some implementations, the user 112 can select particular elements (e.g., a subset of presented elements) of a presented potential theme to use for the new portal site. User selections and other information for the new portal site can be stored in a portal site definitions repository 132.

As used in the present disclosure, the term "computer" is intended to encompass any suitable processing device. For example, although FIG. 1 illustrates a single enterprise portal server 106, environment 100 can be implemented using two or more servers 106, as well as computers other than servers, including a server pool. Indeed, enterprise portal server 106 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated enterprise portal server 106 may be adapted to execute any operating system, including Linux, UNIX, Windows, Mac OS®, Java™, Android™, iOS or any other suitable operating system. According to one implementation, enterprise portal server 106 may also include or be communicably coupled with an e-mail server, a Web server, a caching server, a streaming data server, and/or other suitable server.

The enterprise portal server 106 also includes an interface, one or more processors, and a memory (each not shown). The interface is used by the enterprise portal server 106 for communicating with other systems in a distributed environment—including within the environment 100—connected to the network 110; for example, the client 102, as well as other systems communicably coupled to the network 110 (not illustrated). Generally, the interface comprises logic encoded in software and/or hardware in a suitable combination and operable to communicate with the network 110. More specifically, the interface may comprise software supporting one or more communication protocols associated with communications such that the network 110 or interface's hardware is operable to communicate physical signals within and outside of the illustrated environment 100.

Each processor included in the enterprise portal server 106 may be a central processing unit (CPU), a blade, an application specific integrated circuit (ASIC), a field-programmable gate array (FPGA), or another suitable component. Generally, each processor included in the enterprise portal server 106 executes instructions and manipulates data to perform the operations of the enterprise portal server 106. Specifically, each processor included in the enterprise portal server 106 executes the functionality required to receive and respond to requests from the client 102, the legal server 108, or the organizational website server 104, to name a few examples.

Regardless of the particular implementation, "software" may include computer-readable instructions, firmware, wired and/or programmed hardware, or any combination thereof on a tangible computer-readable storage medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The enterprise portal server 106 includes a memory or multiple memories. The memory included in the enterprise portal server 106 may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise portal server 106.

The client 102 may be any computing device operable to connect to or communicate with at least the enterprise portal server 106 via the network 110 using a wireline or wireless connection. In general, the client 102 comprises an electronic computer device operable to receive, transmit, process, and store any appropriate data associated with the environment 100 of FIG. 1. The client 102 can include one or more client applications, including, for example, the browser 124. A client application is any type of application that allows the client 102 to request and view content on the client 102. In some implementations, a client-application can use parameters, metadata, and other information received at launch to access a particular set of data from the enterprise portal server 106. In some instances, a client application may be an agent or client-side version of the one or more enterprise applications running on the enterprise portal server 106.

The client 102 further includes an interface, one or more processors, and a memory (each not shown). The interface of the client 102 is used by the client 102 for communicating with other systems in a distributed environment—including within the environment 100—connected to the network 110; for example, the enterprise portal server 106, the organizational website server 104, as well as other systems communicably coupled to the network 110 (not illustrated). Generally, the interface of the client 102 comprises logic encoded in software and/or hardware in a suitable combination and operable to communicate with the network 110. More specifically, the interface of the client 102 may comprise software supporting one or more communication protocols associated with communications such that the network 110 or interface's hardware is operable to communicate physical signals within and outside of the illustrated environment 100.

Each processor included in the client 102 may be a central processing unit (CPU), an application specific integrated circuit (ASIC), a field-programmable gate array (FPGA), or another suitable component. Generally, each processor included in the client 102 executes instructions and manipulates data to perform the operations of the client 102. Specifically, each processor included in the client 102 executes the functionality required to send requests to the enterprise portal server 106 and to receive and process responses from the enterprise portal server 106.

The GUI 113 of the client 102 interfaces with at least a portion of the environment 100 for any suitable purpose, including generating a visual representation of the browser 124. In particular, the GUI 113 may be used to view and navigate various Web pages, such as the existing organizational site or the new portal site. Generally, the GUI 113 provides the user 112 with an efficient and user-friendly presentation of business data provided by or communicated within the system. The GUI 113 may comprise a plurality of customizable frames or views having interactive fields, pull-down lists, and buttons operated by the user 112. For example, the GUI 113 may provide interactive elements that allow the user 112 to interact with the existing organizational site, the new portal site, as well as other components within and/or external to environment 100. The GUI 113 contemplates any suitable graphical user interface, such as a combination of a generic web browser, intelligent engine, and command line interface (CLI) that processes information and efficiently presents the results to the user visually.

The memory included in the client 102 may include any memory or database module and may take the form of volatile or non-volatile memory including, without limitation, magnetic media, optical media, random access memory (RAM), read-only memory (ROM), removable media, or any other suitable local or remote memory component. The memory included in the client 102 may store various objects or data, including the potential themes 130, user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 102.

There may be any number of clients 102 associated with, or external to, the environment 100. For example, while the illustrated environment 100 includes one client 102, alternative implementations of the environment 100 may include multiple clients 102 communicably coupled to the enterprise portal server 106 and/or the network 110, or any other number suitable to the purposes of the environment 100. Additionally, there may also be one or more additional clients 102 external to the illustrated portion of environment 100 that are capable of interacting with the environment 100 via the network 110. Further, the term "client" and "user" may be used interchangeably as appropriate without departing from the scope of this disclosure. Moreover, while the client 102 is described in terms of being used by a single user, this disclosure contemplates that many users may use one computer, or that one user may use multiple computers.

The illustrated client 102 is intended to encompass any computing device such as a desktop computer, laptop/notebook computer, wireless data port, smart phone, personal data assistant (PDA), tablet computing device, one or more processors within these devices, or any other suitable processing device. For example, the client 102 may comprise a computer that includes an input device, such as a keypad, touch screen, or other device that can accept user information, and an output device that conveys information associated with the operation of the enterprise portal server 106 or the client 102 itself, including digital data, visual information, or the GUI 113, as shown with respect to the client 102.

Figure 2:
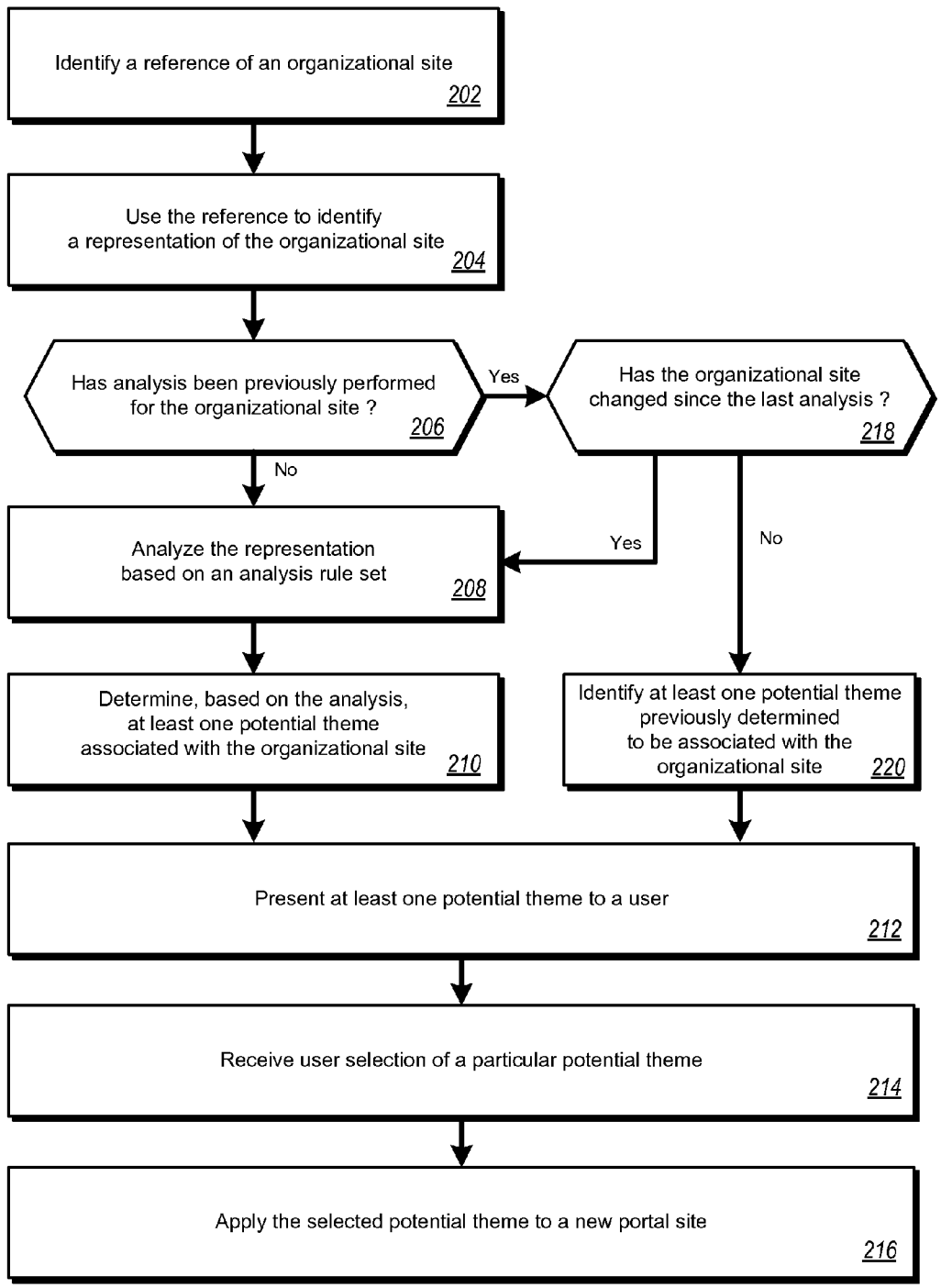
FIG. 2 is a flowchart of an example method for determining one or more themes for a portal site.

FIG. 2 is a flowchart of an example method 200 for determining one or more themes for a portal site. For clarity of presentation, the description that follows generally describes method 200 and related methods in the context of FIG. 1. However, it will be understood that method 200 and related methods may be performed, for example, by any other suitable system, environment, software, and hardware, or a combination of systems, environments, software, and hardware, as appropriate. For example, one or more of the enterprise portal server, the client, or other computing device (not illustrated) can be used to execute method 200 and related methods and obtain any data from the memory of the client, the enterprise portal server, or the other computing device (not illustrated).

At 202, a reference to an organizational site is identified, where the organizational site is to be used as a thematic basis for a new portal site. For example, a user can enter a URL of an organizational site, such as on a web page, popup window, or other user interface. As another example, the user can select a link of an existing organizational site, where the link is presented on a user interface, such as a web page.

At 204, the reference is used to identify a representation of the organizational site. For example, a request can be sent to an organizational website server to retrieve the representation of the organizational site. The representation can include, for example, HTML, CSS, and JavaScript®. A DOM can be generated for the organizational site, such as by using a client browser, a browser simulator running on a server, or any other method. The representation can include various elements of the organizational site, including multiple levels of headers, paragraph text, user interface controls, frames, images (e.g., an organizational logo), and other elements. Each element can include formatting (e.g., style) information. The representation can include one or more legal assets, such as elements that relate or link to privacy policy, terms of use, copyright, or trademark information.

Figure 3:
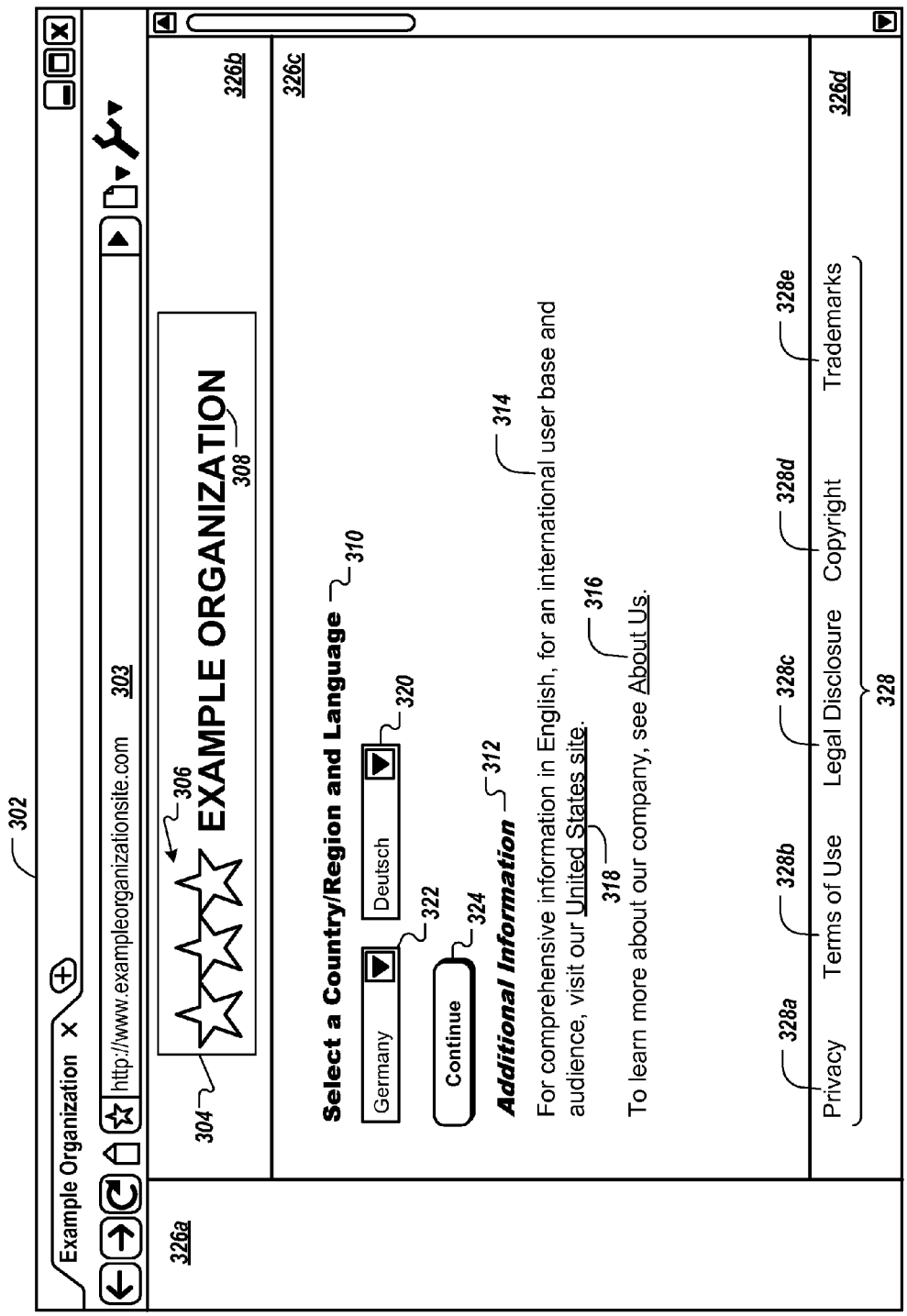
FIG. 3 is a user interface of an example organizational site.

For example, FIG. 3 is a user interface of an example organizational site 300 displayed in a browser 302. An address bar 303 displays a reference to the organizational site (e.g., a URL of "http://exampleorganizationsite.com"). The site 300 includes various elements, where each element is presented in a particular style, such as using a particular font face, font size, font color, font weight, background color, foreground color, border color, border thickness, border line style, or other style characteristics.

An organizational logo 304 includes images 306 and text 308. The site 300 includes a level one heading 310 and a level two heading 312, each displayed in a different style. In the illustrated example, the styles used for the headings 310 and 312 are different from the styles used for paragraph text 314 and for links 316 and 318. The site 300 includes user interface controls, such as dropdown controls 320 and 322 and a button control 324. A font used for the dropdown controls 320 and 322 is different from a font used for the button control 324. Each of the controls 320, 322, and 324 can be presented using, for example, a particular border style (e.g. border thickness, shading, etc.). Other types of elements can be included in the site 300, such as other images, and one or more tables, where each element has an associated style.

The site 300 includes frames 326a, 326b, 326c, and 326d. Each of the frames 326a, 326b, 326c, and 326d can include various elements, including elements other than what are illustrated for the site 300. The frame 326d includes a set of links 328, including a privacy link 328a, a terms of use link 328b, a legal disclosure link 328c, a copyright link 328d, and a trademarks link 328e.

The representation of the site 300 can include descriptions of each of the elements 304-328. Each element description can describe the type of element, text for the element (if any), the location of the element, and the appearance of the element, including font, color, border, and other style information.

Returning to FIG. 2, a determination is made as to whether analysis has previously been performed for the organizational site (or whether a prior analysis should be updated) at 206. For example, a themes repository (e.g., the themes repository 128) can be queried to determine whether one or more themes have been previously determined for the organizational site. In some instances, previously determined themes may no longer be valid, or may require additional analysis to provide timely suggestions.

If analysis has not been previously performed for the organizational site, the representation is analyzed, at 208, based on an analysis rule set. At 210, a determination is made, based on the analysis, of at least one potential theme associated with the organizational site. The analysis rule set can be defined, for example, by an administrator. The administrator can configure, for example, one or more element types to use for determining a thematic basis. As another example, the administrator can configure one or more legal asset-related phrases for which to search when identifying legal assets.

Figure 4:
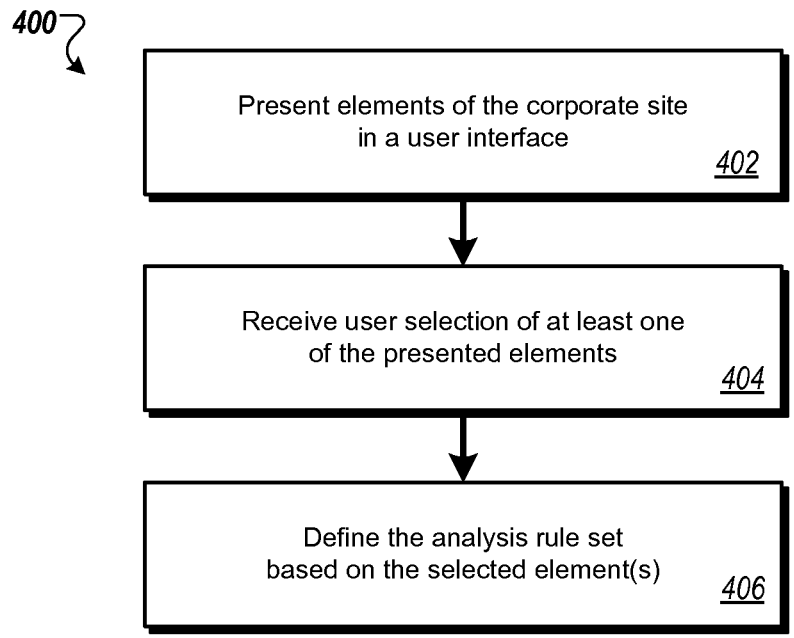
FIG. 4 is a flowchart of an example method for defining an analysis rule set based on user input.

The analysis rule set can be defined, at least in part, based on user input. In some instances, in response to identifying a reference of the organizational site, users may be provided an interactive view of the organizational page, where the user can select one or more elements to be included with and/or considered by the analysis rule set. For instance, FIG. 4 is a flowchart of an example method 400 for defining an analysis rule set based on user input. At 402, one or more elements of the organizational site are presented in a user interface. For example, in some implementations, the entire organizational site is presented in a web browser. In other implementations, particular elements of the organizational site are presented. For example, a set of element types can be identified (e.g., level one heading, level two heading, level three heading, paragraph text, image, button control) and for each identified element type, one or more elements of the identified element type can be identified in the representation of the organizational site (e.g., for those element types which are included in the representation). The identified elements can be presented to the user as a sampling (e.g., subset) of elements that are included in the organizational site.

At 404, user selection of one or more of the presented elements is received. For example, the user can consider each presented element and can select a respective element if the user desires that the style of the respective element be incorporated into the new portal site. As another example, the user can select a legal asset (e.g., a link to a legal topic, such as a privacy policy) to indicate that the user desires that legal asset to be included in the new portal site. The user can, in turn, select multiple elements and can select a user interface control (e.g., a button control) to indicate completion of the selection of presented elements. In some instances, the user may be able to indicate whether a particular selected element is associated with a legal asset or a stylistic element, or both.

At 406, the analysis rule set is defined, at least in part, based on the one or more selected elements. For example, the analysis rule set can be defined based on the styles of the selected elements, such that the styles of the selected elements are weighted higher than the styles of unselected elements, in a subsequent stylistic analysis.

The analysis rule set can be associated, at least in part, with one or both of a legal asset analysis or a stylistic analysis. In some implementations, a user can configure whether to perform a stylistic analysis, a legal assets analysis, or both types of analyses.

Figure 5:
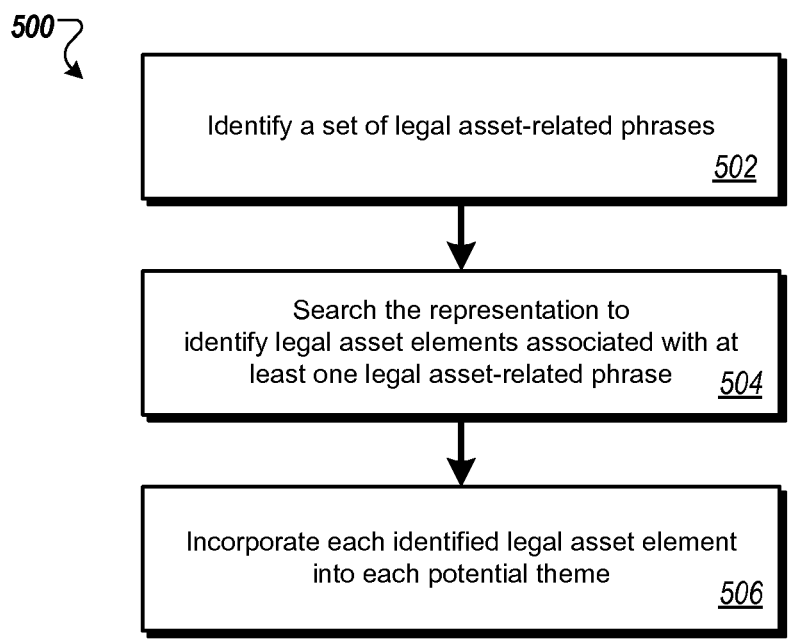
FIG. 5 is a flowchart of an example method for performing a legal asset analysis.

FIG. 5 is a flowchart of an example method 500 for performing a legal asset analysis. At 502, a set of legal asset-related phrases is identified. For example, a predefined set of legal asset phrases can be identified, such as a list of legal asset-related phrases that is maintained by an administrator. Legal asset-related phrases can include, for example, one or more phrases related to privacy, trademarks, terms of use, contact information, an organizational logo, or copyright. For example, phrases related to terms of use can include "terms," "terms of use," and "terms and conditions." As another example, phrases related to privacy can include "privacy," "privacy policy," and "your privacy."

As another example, a set of one or more legal asset-related phrases can be received from a legal server. For example, a list of legal asset-related phrases to be used in a legal assets analysis can be periodically (e.g., daily, monthly) updated using phrases received from the legal server, or the legal server can be queried for a current list of legal asset-related phrases each time a legal assets analysis is performed. The legal server can offer a service of providing an up-to-date list of legal asset-related phrases that may be relevant for inclusion in an organizational site.

At 504, the representation is searched to identify legal asset elements associated with at least one legal asset-related term. Searching the representation can include searching presentation text of elements, searching identifiers of elements (e.g., for identifiers such as TERMS_LINK, COPYRIGHT_LINK, PRIVACY_LINK, etc.), using an exact word search, using a partial word search, using a natural language search, or searching a URL associated with an element, to name a few examples. In some implementations, an element can be identified as a legal asset element, at least in part, based on the location of the element, such as if the element is located at the bottom of the organizational site.

As another example, a container element (e.g., a DIV (division), frame, or table element) can be identified that includes at least a threshold number (e.g., two) of elements that have been identified as legal asset elements. In some implementations, each of the other elements included in the container element can be also identified as a legal asset element, even though those elements were not otherwise determined to be legal asset elements. In other words, the analysis rule set can be defined such that elements that are included in a container with several other legal asset elements can also be treated as legal asset elements, even if a search did not identify all of the elements in the container as legal asset elements. In still other instances, one or more elements outside of a container element, but relatively nearby to an identified legal asset element, may be treated as a legal asset element.

For example and referring again to FIG. 3, suppose a search for legal asset-related phrases of a representation of the organizational site 300 resulted in the identification of the links 328a, 328b, 328c, and 328d as being associated with a legal asset-related term (and thus as legal asset elements). The link 328e can also be identified as a legal asset element, due to the link 328e being in a same container (e.g., the frame 326d, or a DIV or table element) as the other, identified links 328a, 328b, 328c, and 328d.

In some implementations, an organizational logo (e.g., the logo 304, a corporate logo) can be identified as a legal asset element. For example, an element can be identified as an organizational logo by identifying an organization name in text that is included in the element (e.g., the text 308), by identifying an organizational name in a file name or file path associated with the element (e.g., an image file name), or by identifying a keyword such as "logo," or some other keyword, in a file name or file path that is associated with the element. In some implementations, an organizational logo can be identified as a stylistic image element.

Returning to FIG. 5, at 506, each of the identified legal asset elements is incorporated into each potential theme. For example, for each identified legal asset element, a representation of the legal asset element (e.g., HTML code, CSS code) can be identified and the representation of each legal asset element can be included in template code that is incorporated into each potential theme that is associated with the organizational site. A representation of the legal asset can include, for example, link text, a link URL, and formatting information. The representations of the legal assets can be stored in a repository and can be used for potential themes for future portal sites that are based on the same organizational site.

Figure 6A:
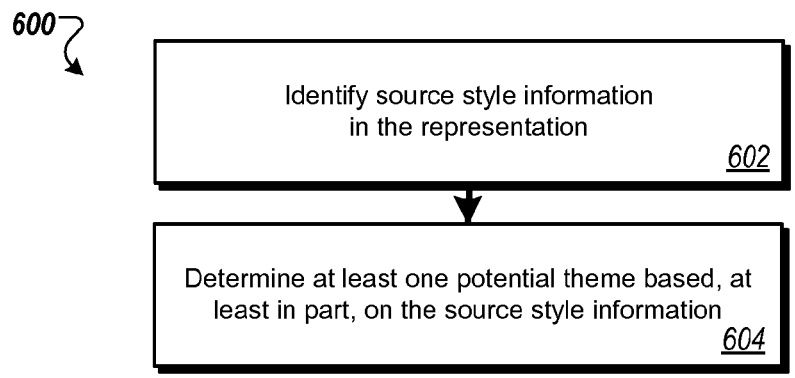
FIG. 6A is a flowchart of an example method for performing a stylistic analysis.

FIG. 6A is a flowchart of an example method 600 for performing a stylistic analysis. At 602, source style information is identified in the representation. For example, source style information can be identified by parsing the DOM, parsing HTML code, or parsing CSS code.

Figure 6B:
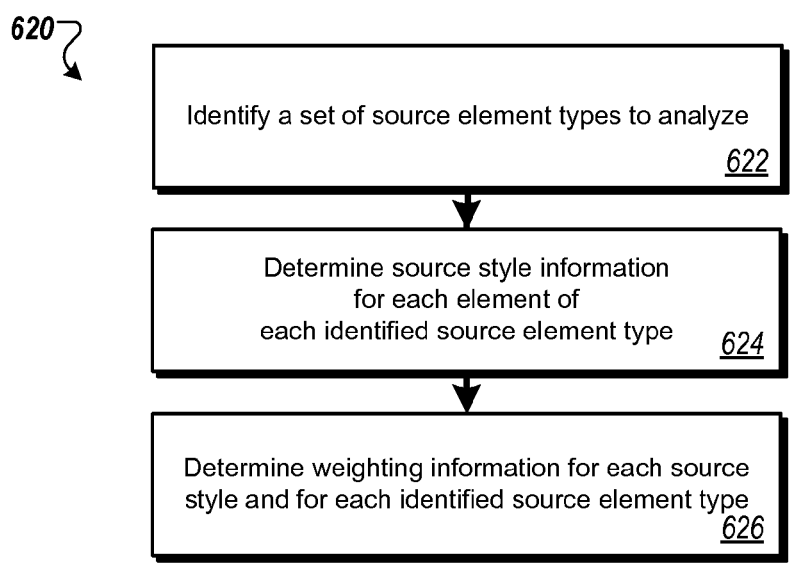
FIG. 6B is a flowchart of an example method for identifying source style information in a representation of an organizational site.

In further detail, FIG. 6B is a flowchart of an example method 620 for identifying source style information in a representation of an organizational site. At 622, a set of source element types to analyze is identified. For example, a predefined set of source element types can be identified. The predefined set of source element types can include source element types that have been identified as important or typical for determining a style of a website, such as header elements, text elements, a page element (e.g., having a particular background color), and image elements. In some implementations, an administrator maintains a set of source element types.

As another example, a set of source element types to analyze can be determined by identifying element types that are included in the representation and by identifying a subset of important element types from those identified element types, where the important element types are identified through the use of an algorithm. The algorithm can include, for example, identifying important element types based on a count or frequency of occurrence (e.g., a frequency based on the total number of elements, the number of pages or lines in the organizational site, or some other measure), font size (e.g., with a larger font size indicating more importance than a smaller font size), or font weight (e.g., with bold text indicating more importance than non-bold text).

At 624, source style information is determined, from the representation, for each element of each identified source element type. The source style information can identify one or more source styles in use in the representation for at least one element of the source element type, and a frequency of occurrence for the source style for the source element type. A source style can include one or more style characteristics, such as foreground color, background color, and font information (e.g., font-face, font-weight, font-size, font-family (e.g., Arial). In some implementations, a particular style characteristic may be included in multiple source styles for a source element type. For example, one or more level one header elements may have a blue foreground color and have text of an Arial font-face, while one or more other level one header elements may have a red foreground color and an Arial font-face. Identified source styles for the level one header element type can include, for example, "foreground red," "foreground blue," "Arial font-face," "foreground red with Arial font face," and "foreground blue with Arial font-face."

In some implementations, small differences in style are ignored. For example, if two elements of a source element type have the same style except for small differences such as slightly different padding or slightly different margins, it can be considered that the two elements have the same style. The types of "small" differences to be ignored can be defined within the analysis rule set, and may be defined by default or specified by the user or administrator.

In some implementations, the source style information is stored in an intermediate style information structure. An intermediate style information structure can be stored, for example, in memory, and/or in a persistent repository, such as a database table or file.

FIG. 6C is a table illustrating an example intermediate style information structure 650. The structure 650 lists an appearances count 651 for multiple pairings of an element type 652 and a style 654. For example, an entry "1" indicates that there are four occurrences of "H1" (e.g., level one heading) elements in the representation that had a style of "Arial font-face." As another example, an entry "2" indicates that there is one occurrence of an "H1" element that has a style of "red foreground, Arial font-face."

Returning to FIG. 6B, at 626, weighting information is determined, for each source style and for each identified source element type, based, at least in part, on the source style information. In some implementations, the weighting information is stored in the intermediate style information structure. For example, with respect to FIG. 6C, each entry in the structure 650 includes a weight value 658. In some implementations, the weight value corresponds to a percentage of appearances of a source style for a source element type divided by the total number of appearances of the source element type in any style. For example, for the entry "2," the weight value is 25%, since one out of four "H1" elements has the "red foreground, Arial font-face" style.

Figure 7:
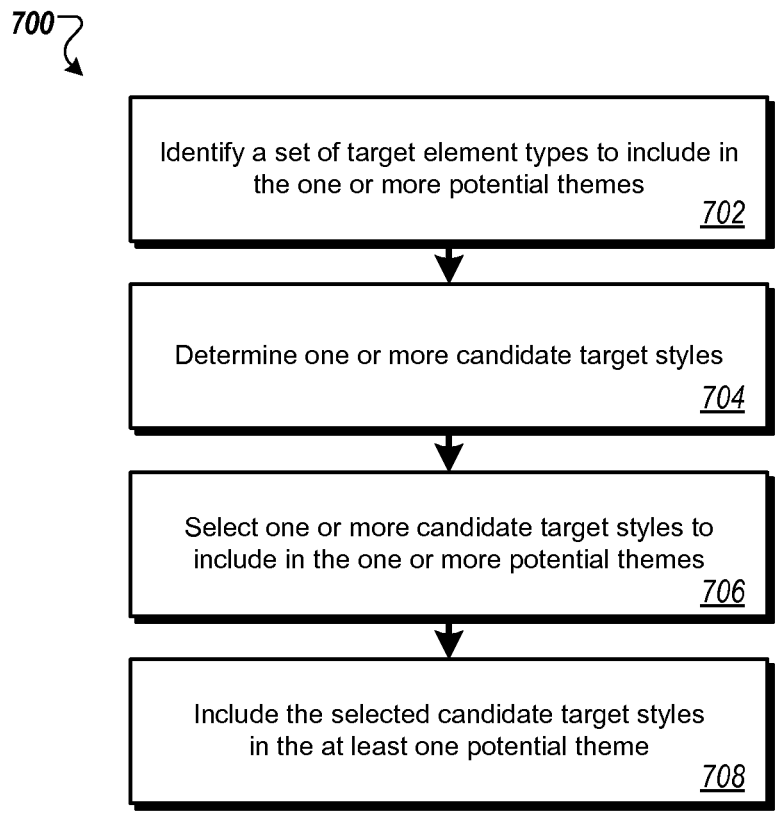
FIG. 7 is a flowchart of an example method for determining at least one potential theme based, at least in part, on source style information.

Returning to FIG. 6A, at 604, at least one potential theme is determined based, at least in part, on the source style information. In further detail, FIG. 7 is a flowchart of an example method 700 for determining at least one potential theme based, at least in part, on the source style information. At 702, a set of target element types to include in the one or more potential themes is identified. For example, in some implementations, target content to include in the new portal site is identified. For example, the target content can include one or more web pages including content and style information. For example, in some implementations, some or all content for the new portal site may be defined before an organizational site is selected as a thematic basis for the new portal site. In such implementations, identifying a set of target element types to include in the one or more potential themes can include determining one or more target element types that occur in the target content.

In some implementations, the organizational site can be selected as a thematic basis for the new portal site before any content has been defined for the new portal site. In such implementations, the set of source element types can be selected as the set of target element types. In some implementations, the set of target element types can be determined based on identifying one or more element types from the target content and one or more element types from the set of source element types, where at least some of the element types from the set of source element types are not included in the target content. For example, the target content can include one or more first level heading elements but no second level heading elements, and the set of target element types can include a first level heading element type and a second level heading element type, with the second level heading element type being included in the set of source element types.

At 704, one or more candidate target styles are determined. For example, in implementations where the organizational site is selected as a thematic basis for the new portal site before content has been defined for the new portal site, a candidate target style for each element type in the set of target element types can be determined. In some implementations, identifying a candidate target style for an element type involves identifying a dominant style for the element type. A dominant style for an element type can, for example, be a style in use for the element type that has a highest weight. For example, with respect to FIG. 6C and considering entries "10" and "11" that are associated with an input element type, a dominant style of "left-justified, Arial font-face" can be identified as the dominant style for the input element, since the weight of 67% for the "left-justified, Arial font-face" style (e.g., entry "11") is higher than a weight of 33% for a "centered, bold, Arial font-face" style (e.g., entry "10").

As another example, one or more candidate target styles for an element type can be determined by determining one or more styles that have a weight greater than a threshold in the source style information. For example, with respect to FIG. 6C, suppose that the threshold is a weight of 30%. Candidate target styles for an input element type can include the "left-justified, Arial font-face" style (e.g., entry "11") and the "centered, bold, Arial font-face" style (e.g., entry "10"), since both styles have a weight that is greater than the threshold. If a particular element type does not have any styles that are above the threshold, then the one or more styles that have the highest weight can, for example, be selected as candidate target styles for the element type. As another example, all of the styles in use in the organizational site for the element type can be selected as candidate target styles for the element type.

As yet another example, in implementations where the organizational site is selected as a thematic basis for the new portal site after some or all of the content for the new portal site has been defined, one or more candidate target styles can be determined for one or more elements occurring in the target content. For example, a set of elements occurring in the target content can be identified (e.g., where the set can include one or more elements of one or more element types).

As an example, the target content can include a first level heading element that has a particular color (e.g., color "X"). The source style information can include color information for a first level heading element type. For example, the organizational site can include multiple first level heading elements, of various colors, and the source style information can include information which identifies several colors (e.g., colors "A", "B", "C", and "D") that are associated with the first level heading element type.

One or more candidate target styles (e.g., each defining a color, among other possible style characteristics) can be identified for the first level heading element type. Each candidate target style for the first level heading element type can refer to one of the colors "A", "B", "C", or "D". That is, a candidate target style for a first level heading for the new portal site can refer to a color that is used for one or more first level heading elements in the organizational site.

A candidate target style can be determined, for example, based at least in part on one or more distance functions. For example, if color is represented by RGB (Red, Green, Blue) values, a color distance function can be defined as $$\text{distance (color1, color2)} = \sqrt{(r1-r2)^2 + (g1-g2)^2 + (b1-b2)^2}$$

which is the color distance between a "color1" and a "color2," where (r1, g1, b1) is the color of "color1" and (r2, g2, b2) is the color of "color2."

In the example above where color "X" is the color of a first level heading element in the target content and colors "A", "B", "C", and "D" are colors of first level headings in the organizational site, a color distance can be calculated between color "X" and each of the colors "A", "B", "C", and "D". One or more candidate target styles can be determined based on the determined color distances. For example, a candidate target style for first level heading elements can be determined as having the color "A", "B", "C", or "D" based on which color has the smallest associated color distance from the color "X". As another example, one or more candidate target styles that each define a color for first level heading elements can be determined based on identifying one or more of the colors "A", "B", "C", and "D" that have a color distance from the color "X" that is less than a threshold.

Other types of distance functions for color can be used, and some or all distance functions can be based on the weighting information included in the source style information. Other distance functions, which can be numerically based or otherwise based, can also be used for other style attributes, such as font weight, font size, etc.

At 706, one or more candidate target styles to include in the at least one potential theme are selected. For example, one or more candidate target styles can be automatically selected (e.g., based on weighting information, a distance function).

Figure 8:
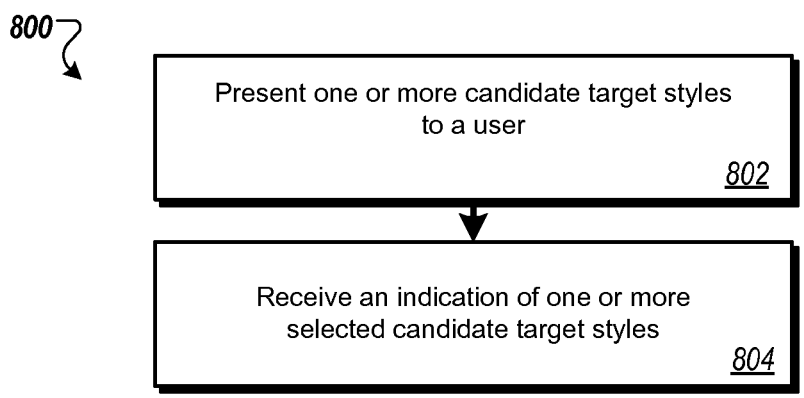
FIG. 8 is a flowchart of an example method for selecting one or more candidate target styles based on user input.

As another example, one or more candidate target styles can be selected based on user input. For example, FIG. 8 is a flowchart of an example method 800 for selecting one or more candidate target styles based on user input. At 802, one or more candidate target styles are presented to a user. For example, the user may be presented with a user interface which includes, for one or more target element types, a brief description of the target element type and one or more samples of the presentation of one or more elements of the target element type, with each sample being presented using a respective candidate target style. For example, in implementations where the organizational site is selected as a thematic basis for the new portal site after some or all of the content for the new portal site has been defined, some or all of the content for the new portal site can be presented in the user interface. One or more candidate target styles can be presented for each of one or more portions of target content, where each portion corresponds to a particular element type. In implementations where the organizational site is selected as a thematic basis for the new portal site before content is defined for the new portal site, default sample content (e.g., "This is a sample H1 element") can be presented.

At 708, the selected candidate target styles are included in the at least one potential theme. For example, a potential theme can include, for each selected candidate target style, an indication of the selected candidate target style (e.g., using CSS or other code which describes a mapping of a respective element or element type with a description of the selected style). In some implementations, CSS classes are used for grouping element types that have a same or similar selected candidate target style.

Returning to FIG. 2, at 212, at least one potential theme is presented to a user. For example, if a legal assets analysis has been performed, a potential theme displaying the identified legal assets can be presented to the user. As another example, if a stylistic analysis has been performed, one or more example themes that display a set of selected styles can be presented. If both a legal assets analysis and a stylistic analysis have been performed, in some implementations, a potential theme that displays both identified legal assets and selected styles can be presented. In other implementations, a first theme that displays legal assets and a second theme that displays selected styles can be presented.

In some implementations, a rating for each potential theme or legal asset is determined. For example, a rating for a potential theme can indicate how strongly the potential theme is reflected in the representation. For example, a first potential theme that includes, for example, an Arial font and a black foreground color for 50% of the elements in the representation may receive a particular rating (e.g., 50%, five out of ten, 2.5 out of five stars, three out of five stars, etc.) and a second potential theme that includes a Courier font and a blue foreground color for 40% of elements in the representation may receive a different rating (e.g., 40%, four out of ten, two out of five stars). If ratings are determined for potential themes, a respective rating can be presented to the user when the potential theme is presented to the user.

At 214, user selection of a particular potential theme is received. For example, if one theme is presented, the user can confirm that they desire to use the one theme for the new portal site. As another example, if multiple themes are presented, the user can select one of the presented themes. For example, if a set of multiple themes are presented to the user as a set of candidate themes (e.g., where each theme displays a different set of selected styles), the user can select one theme from the set of candidate themes.

At 216, the selected potential theme is applied to the new portal site. For example, if the potential theme includes legal assets, the legal assets can be included in the new portal site. As another example, if the potential theme includes styles, the styles can be applied to the new portal site. In some implementations, the selected theme is applied to the new portal site and then the user adds content to the new portal site. In other implementations, the selected theme is applied to a site that already includes content. As another example, the application of a theme to a new portal site can be performed in combination with another process which extracts content from the organizational site for inclusion in the new portal site.

Figure 9:
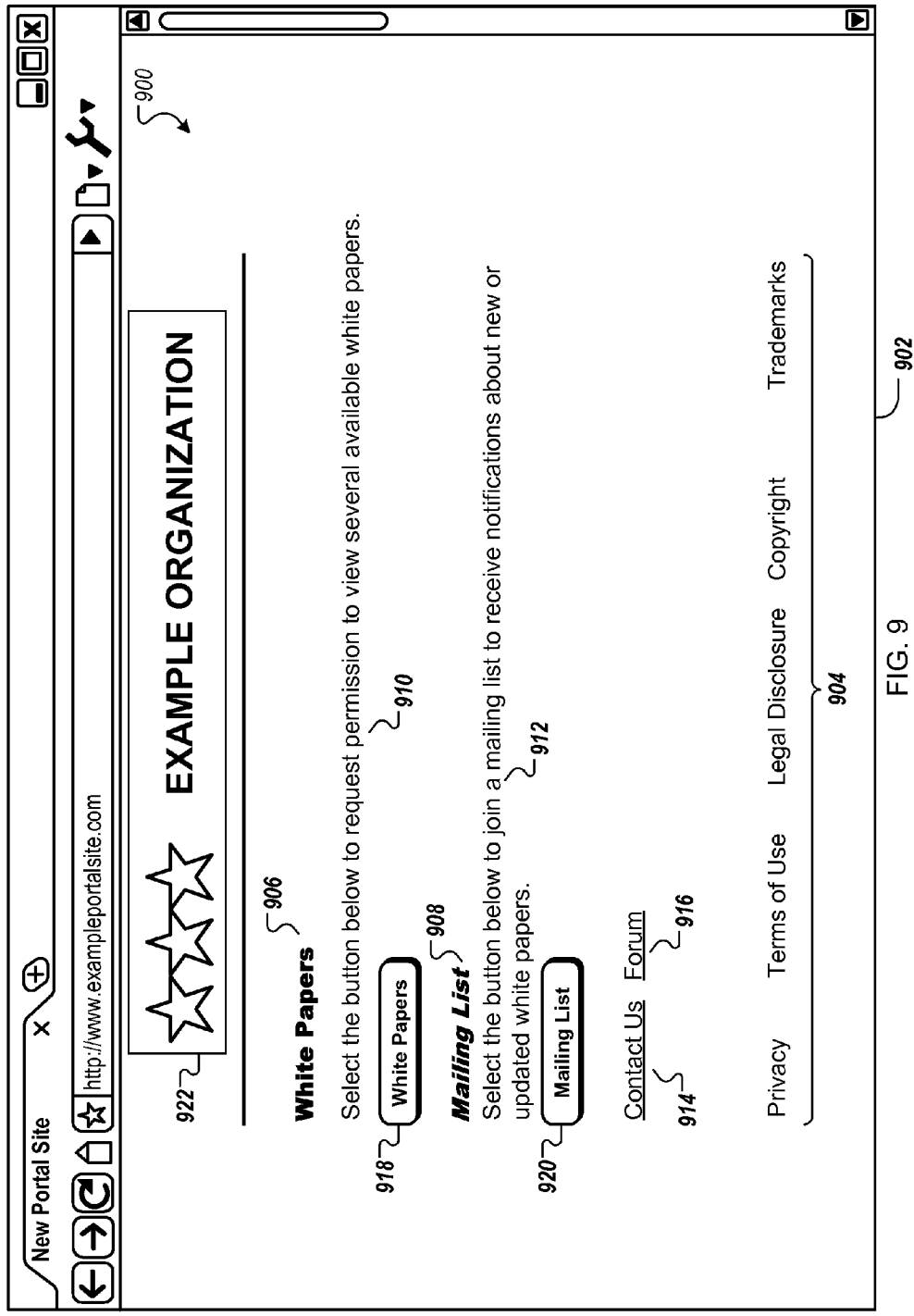
FIG. 9 is a user interface of a new portal site.

FIG. 9 is a user interface of a new portal site 900 that is displayed in a browser 902. Legal assets 904 are included in the portal site 900 based on the identification of the corresponding legal assets 328. A level one heading 906 and a level two heading 908 are presented using the same styles as used for the level one heading 310 and the level two heading 312, respectively. A style used for the paragraph text 314 has been applied to paragraph text 910 and 912. A style used for the links 316 and 318 has been applied to links 914 and 916. A style used for the button control 324 has been applied to button controls 918 and 920. The organizational logo 304 has been included in the new portal site 900, as illustrated by a logo 922.

Returning to FIG. 2, if analysis has been previously performed for the organizational site (e.g., as may be determined at 206), at 218, a determination is made as to whether the organizational site has changed since the last analysis. For example, the representation can be compared to a previously-analyzed representation.

At 220, at least one potential theme previously determined to be associated with the organizational site is identified. In implementations where the organizational site is selected as a thematic basis for the new portal site after some or all of the content for the new portal site has been defined, at least one potential theme previously determined to be associated with the organizational site and with the new portal site is identified. At 212, the identified one or more potential themes previously determined to be associated with the organizational site are presented to the user. That is, the previously determined themes are presented to the user and the representation is not re-analyzed. In some instances, previously determined themes may no longer be valid, or may require additional analysis to provide timely suggestions.

Figure 10:
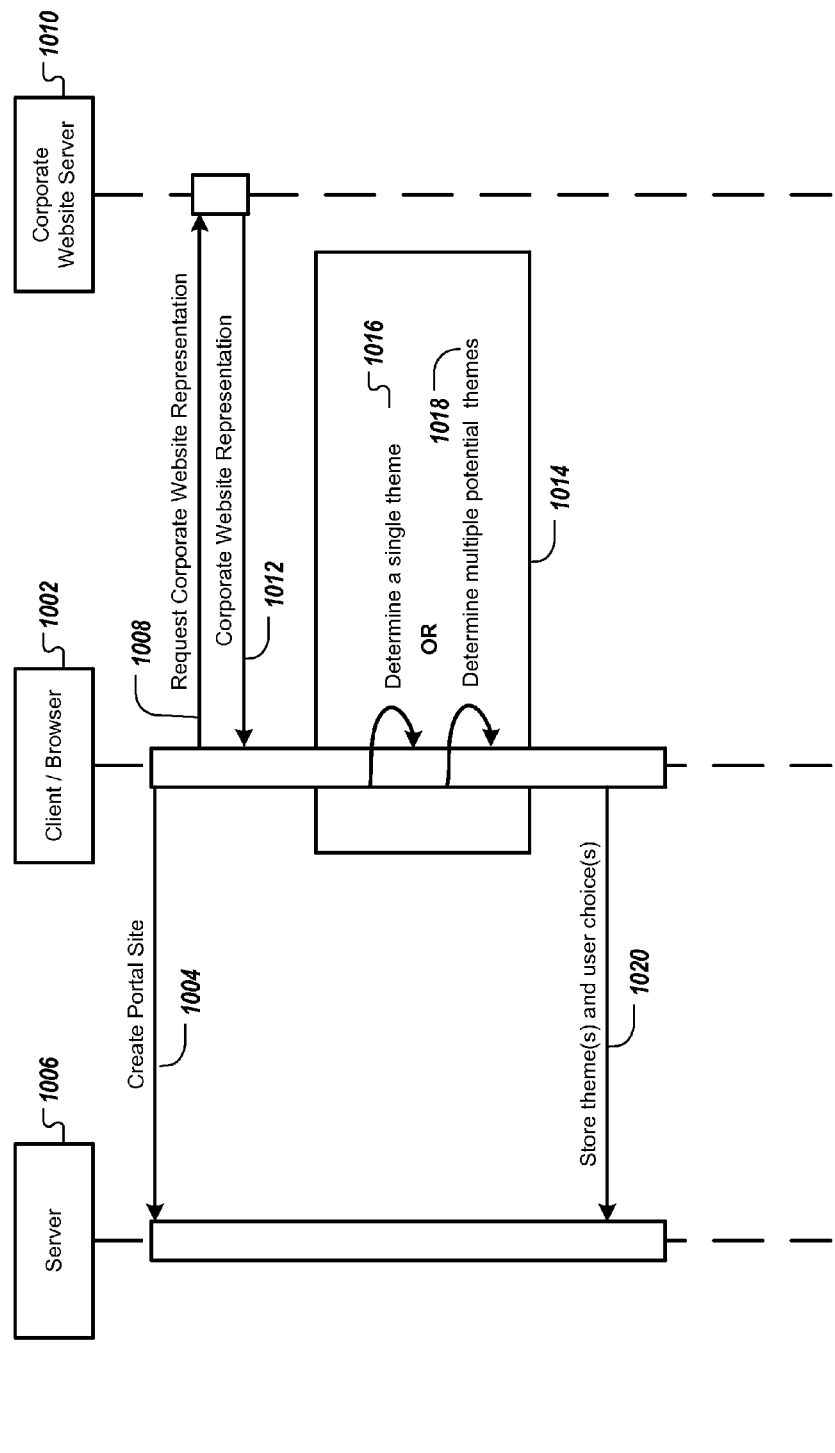
FIG. 10 is a flowchart of an example client-based method for determining one or more themes for a portal site.

FIG. 10 is a flowchart of an example client-based method 1000 for determining one or more themes for a portal site. A client/browser 1002 submits a request 1004 to a server 1006 to create a new portal site based on an existing organizational website. The client/browser 1002 sends a message 1008 to an organizational website server 1010 to request a representation of the organizational website. The message 1008 can include, for example, a URL of the organizational website. The organizational website server 1010 returns a representation 1012 to the client/browser 1002. The representation 1012 can be, for example, one or more of HTML, CSS, or a DOM. In some implementations, the client/browser 1002 creates a DOM from HTML received from the organizational website server 1010.

The client/browser 1002 performs processing 1014 using the representation 1012. For example, the client/browser 1002 can, as indicated by processing 1016, analyze the representation 1012 based on an analysis rule set and determine, based on the analysis, a single theme, such as a theme that includes stylistic and/or legal assets, that is associated with the organizational website. As another example, as indicated by processing 1018, the client/browser 1002 can analyze the representation 1012 and determine multiple potential themes that are associated with the organizational website. The client/browser 1002 can, for example, present the multiple potential themes to a user and can receive selection of a potential theme from the user. As indicated by a message 1020, the client/browser 1002 can send one or more themes and an indication of a user-selected theme to the server 1006. The server 1006 can store the theme(s) and the indication of the user selection.

Figure 11:
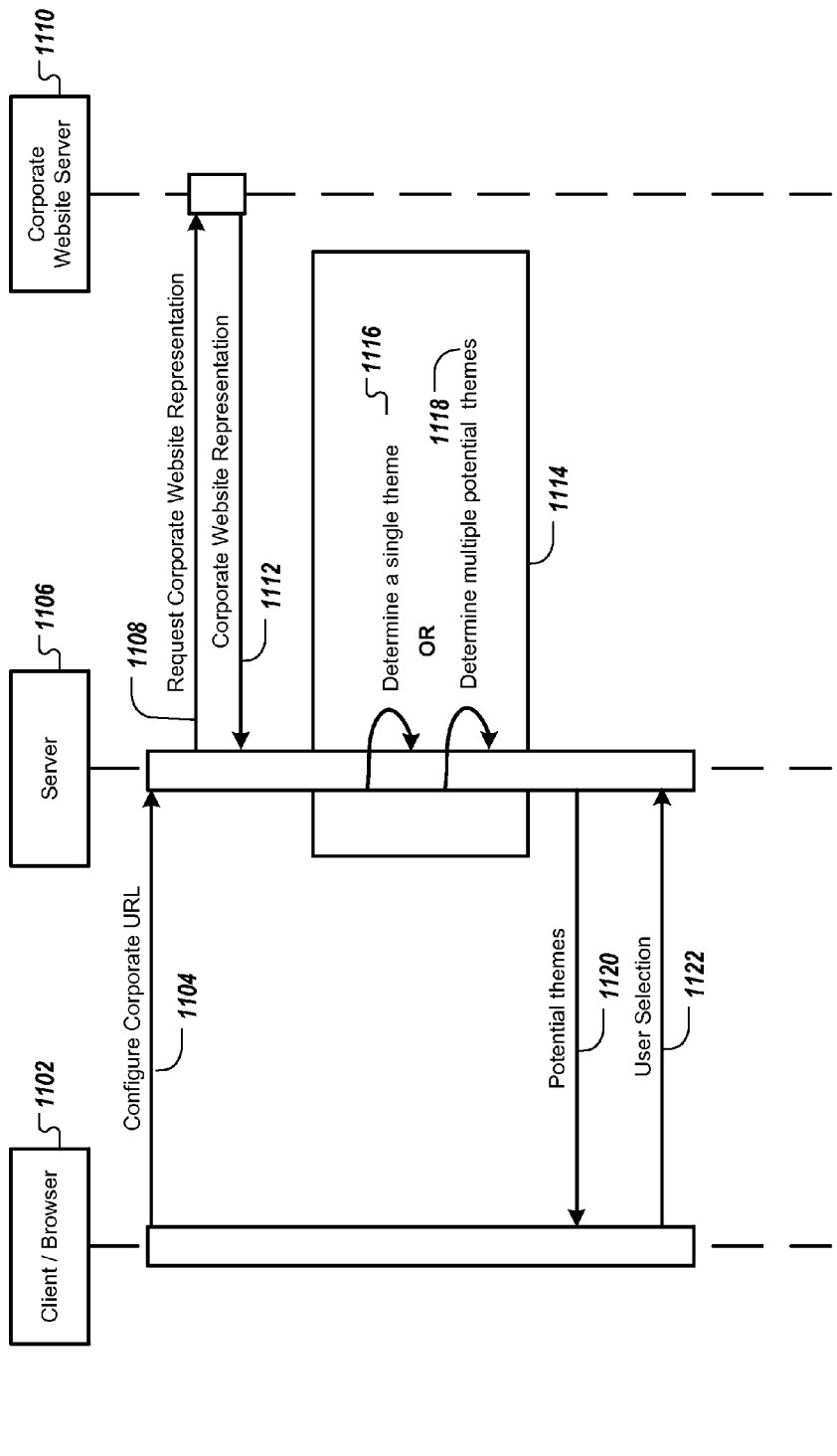
FIG. 11 is a flowchart of an example server-based method for determining one or more themes for a portal site.

FIG. 11 is a flowchart of an example server-based method 1100 for determining one or more themes for a portal site. A client/browser 1102 submits a request 1104 to a server 1106 to create a new portal site based on an existing organizational website. The server 1106 sends a message 1108 to an organizational website server 1110 to request a representation of the organizational website. The message 1108 can include, for example, a URL of the organizational website. The organizational website server 1110 returns a representation 1112 to the client/browser 1102. The representation 1112 can be, for example, one or more of HTML, CSS, or a DOM. In some implementations, the server 1106 creates a DOM from HTML received from the organizational website server 1110 using a browser simulation that runs on the server 1106.

The server 1106 performs processing 1114 using the representation 1112. For example, the server 1106 can, as indicated by processing 1116, analyze the representation 1112 based on an analysis rule set and determine, based on the analysis, a single theme, such as a theme that includes stylistic and/or legal assets, that is associated with the organizational website. As another example and as indicated by processing 1118, the server 1106 can analyze the representation 1112 and determine multiple potential themes that are associated with the organizational website. The server 1106 can, for example and as illustrated by a message 1120, send information corresponding to multiple potential themes to the client/browser 1102, for presentation of the multiple potential themes on the client/browser 1102. The client/browser 1102 can send an indication 1122 of a user selection of a potential theme to the server 1106. The server 1106 can store the potential theme(s) and the indication of the user selection.

The preceding figures and accompanying description illustrate example processes and computer-implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, the method comprising:
    identifying a reference to an existing organizational site, the existing organizational site hosted by an organizational website server, and the existing organizational site used as a thematic basis for a new portal site;
    using the reference to identify a representation of the existing organizational site;
    analyzing the representation based on an analysis rule set associated with a stylistic analysis, wherein the stylistic analysis comprises:
        identifying source style information in the representation, including:
            identifying a set of two or more predefined source element types to analyze;
            for each of two or more of the identified source element types:
                identifying a set of two or more element instances of the source element type in the representation;
                for each identified element instance of the two or more element instances, identifying a source style of the element instance, the source style specifying an appearance of the element instance;
                determining a frequency of occurrence in the representation for each identified source style in use for the source element type; and
                for each source style, determining weighting information for the source style and for the source element type, based, at least in part, on the determined frequency of occurrence in the representation of the source style for the source element type and the number of element instances of the source element type; and
        determining, based on the analysis, at least one potential theme associated with the existing organizational site based, at least in part, on the source style information, including the weighting information;
    presenting the at least one potential theme to a user;

receiving user selection of a particular potential theme; and applying the selected potential theme to the new portal site.

2. The method of claim 1, wherein the analysis rule set is defined, at least in part, by an administrator.

3. The method of claim 1, where the representation comprises one or more of HTML (HyperText Markup Language), CSS (Cascading Style Sheets), or a DOM (Document Object Model).

4. The method of claim 1, where the analysis rule set is defined, at least in part, based on user input.

5. The method of claim 4, further comprising:
presenting one or more elements of the existing organizational site in a user interface;
receiving user selection of one or more of the presented elements; and
defining the analysis rule set, at least in part, based on the one or more selected elements.

6. The method of claim 1, wherein determining the at least one potential theme based, at least in part, on the source style information comprises:
identifying a set of target element types to include in the one or more potential themes;
determining one or more candidate target styles;
selecting one or more candidate target styles to include in the at least one potential theme; and
including the selected candidate target styles in the at least one potential theme.

7. The method of claim 6, wherein selecting one or more candidate target styles comprises automatically selecting one or more candidate target styles.

8. The method of claim 6, wherein selecting one or more candidate target styles comprises:
presenting one or more candidate target styles to a user; and
receiving an indication of one or more selected candidate target styles.

9. The method of claim 6 further comprising identifying target content to include in the new portal site and wherein:
identifying a set of target element types to include in the one or more potential themes comprises determining one or more target element types in the target content; and
determining one or more candidate target styles comprises determining, based at least in part on the source style information, a candidate target style for one or more elements occurring in the target content.

10. The method of claim 6 wherein:
determining a set of target element types to include in the one or more potential themes comprises selecting the set of source element types as the set of target element types; and
determining one or more candidate target styles comprises determining, based at least in part on the source style information, one or more candidate target styles for each element type in the set of target element types.

11. A system comprising:
one or more computers associated with an enterprise portal; and
a computer-readable medium coupled to the one or more computers having instructions stored thereon which, when executed by the one or more computers, cause the one or more computers to perform operations comprising:
identifying a reference to an existing organizational site, the existing organizational site hosted by an organizational website server, and the existing organizational site used as a thematic basis for a new portal site;
using the reference to identify a representation of the existing organizational site;
analyzing the representation based on an analysis rule set associated with a stylistic analysis, wherein the stylistic analysis comprises:
identifying source style information in the representation, including:
identifying a set of two or more predefined source element types to analyze;
for each of two or more of the identified source element types:
identifying a set of two or more element instances of the source element type in the representation;
for each identified element instance of the two or more element instances, identifying a source style of the element instance, the source style specifying an appearance of the element instance;
determining a frequency of occurrence for each identified source style in use for the source element type; and
for each source style, determining weighting information for the source style and for the source element type, based, at least in part, on the determined frequency of occurrence in the representation of the source style for the source element type and the number of element instances of the source element type; and
determining, based on the analysis, at least one potential theme associated with the existing organizational site based, at least in part, on the source style information, including the weighting information;
presenting the at least one potential theme to a user;
receiving user selection of a particular potential theme; and
applying the selected potential theme to the new portal site.

12. A computer program product encoded on a non-transitory storage medium, the product comprising non-transitory, computer readable instructions for causing one or more processors to perform operations comprising:
identifying a reference to an existing organizational site, the existing organizational site hosted by an organizational website server, and the existing organizational site used as a thematic basis for a new portal site;
using the reference to identify a representation of the existing organizational site;
analyzing the representation based on an analysis rule set associated with a stylistic analysis, wherein the stylistic analysis comprises:
identifying source style information in the representation, including:
identifying a set of two or more predefined source element types to analyze;
for each of two or more of the identified source element types:
identifying a set of two or more element instances of the source element type in the representation;
for each identified element instance of the two or more element instances, identifying a source style of the element instance, the source style specifying an appearance of the element instance;
determining a frequency of occurrence in the representation for each identified source style in use for the source element type; and for each source style, determining weighting information for the source style and for the source element type, based, at least in part, on the determined frequency of occurrence in the representation of the source style for the source element type and the number of element instances of the source element type; and determining, based on the analysis, at least one potential theme associated with the existing organizational site based, at least in part, on the source style information, including the weighting information;

presenting the at least one potential theme to a user;
receiving user selection of a particular potential theme; and
applying the selected potential theme to the new portal site.

* * * * *